T. L. SHAW.
Car-Couplings.

No. 157,549. Patented Dec. 8, 1874.

WITNESSES:
Chas. Nida
A. F. Terry

INVENTOR:
T. L. Shaw
BY
Munn
ATTORNEYS.

UNITED STATES PATENT OFFICE.

THOMAS L. SHAW, OF LAURINBURG, ASSIGNOR TO HIMSELF AND HUGH G. FLADGER, OF LILESVILLE, NORTH CAROLINA.

IMPROVEMENT IN CAR-COUPLINGS.

Specification forming part of Letters Patent No. 157,549, dated December 8, 1874; application filed October 3, 1874.

*To all whom it may concern:*

Figure 1:
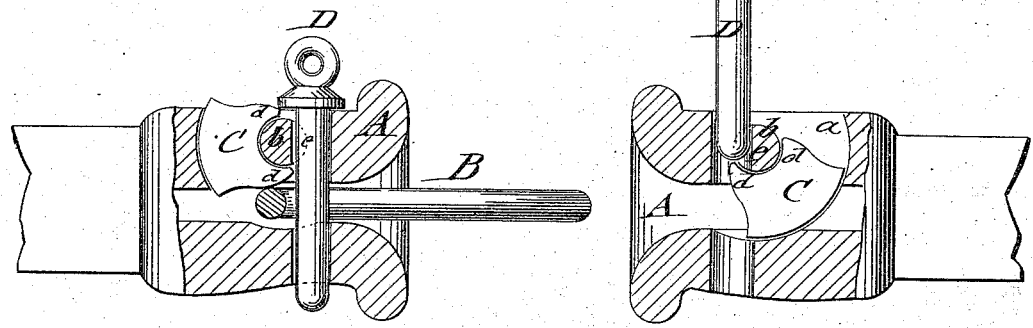
Figure 2:
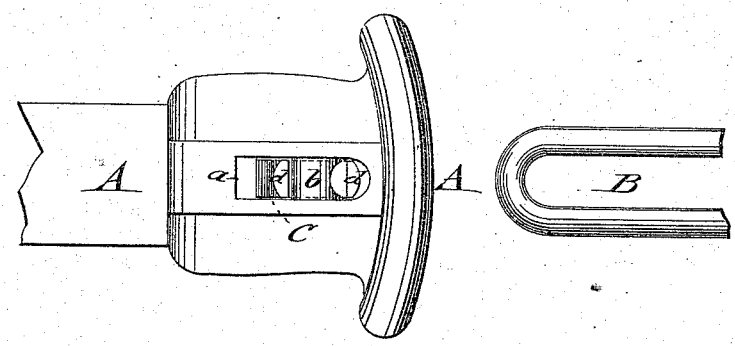

Be it known that I, THOMAS L. SHAW, of Laurinburg, in the county of Richmond and State of North Carolina, have invented a new and Improved Car-Coupling, of which the following is a specification:

In the accompanying drawing, Figure 1 represents a vertical longitudinal section of my improved car-coupling, showing one draw-head in coupled, the other in uncoupled, position; and Fig. 2, a top view of the same.

Similar letters of reference indicate corresponding parts.

The invention will first be fully described, and then pointed out in the claim.

In the drawing, A represents a draw-head of the usual size and material, with tapering mouth for the entrance of the coupling-link B. The top part of draw-head A is provided with a central vertical guide-recess, $a$, which is concentric to a round lateral pin, $b$, and extended slightly into the interior bottom part of the draw-head for the purpose of admitting the easy and unobstructed sliding of a tumbler, C, therein. Tumbler C swings with its concave part around pin $b$, and slides, by its lower convex part, in the guide-recess $a$, the concave part having hook-shaped extensions $d$ for fitting more completely around the guide-pin, and serving, furthermore, as a support for the raised coupling-pin D, when resting in nearly vertical position on the bottom part of draw-head A. The pin D drops into the usual top and bottom perforations of the draw-head, and is guided along a vertical concave front recess, $e$, of tumbler guide-pin $b$. The hook-extension $d$ of the tumbler projects from below into the recess of the guide-pin, and retains thereby the pin in raised position ready for coupling. The entering link strikes the lower front part of tumbler C, and carries the same in the guide-recess in upward direction until it assumes a nearly horizontal direction, closing completely the upper part of recess $a$. The coupling-pin is raised for uncoupling by hand, or by any of the customary appliances, and causes, by the withdrawal of the link, the instant forward sliding of the tumbler until the same assumes a nearly vertical position on the bottom part of the draw-head, and supports on its forward-projecting hook end the pin in raised position, ready for coupling automatically on the entrance of the link. The weight of the tumbler on the coupled link produces the horizontal position of the same for ready introduction to the mouth of the draw-head to be coupled.

Having thus described my invention, I claim as new and desire to secure by Letters Patent—

The combination in a draw-head, with a pin, D, and a turning pin-support, C, of the grooved cross-pin $b$, serving as a guide for both, in the manner shown and described.

THOMAS L. SHAW.

Witnesses:
A. J. CASSIDAY,
D. J. SWINDALL.